United States Patent [19]

Uekubo

[11] Patent Number: 4,517,619
[45] Date of Patent: May 14, 1985

[54] PROTECTIVE RELAY SYSTEM FOR A POWER SYSTEM

[75] Inventor: Yasuhiro Uekubo, Hyogo, Japan

[73] Assignee: Mitsubishi Denki Kabushiki Kaisha, Tokyo, Japan

[21] Appl. No.: 445,846

[22] Filed: Dec. 1, 1982

[30] Foreign Application Priority Data

Dec. 2, 1981 [JP] Japan .................. 56-196163

[51] Int. Cl.³ ............................................. H02H 3/36
[52] U.S. Cl. ......................................... 361/64; 361/66
[58] Field of Search ................ 361/64, 66, 68, 69, 361/81

[56] References Cited

FOREIGN PATENT DOCUMENTS 13149 2/1978 Japan ...................................... 361/68

OTHER PUBLICATIONS

"Fiber-Optics Communication Link for Transmission of Signals in the Presence of High-Power Noise'"—Aranchii et al, Instruments and Experimental Techniques, vol. 18, No. 4, pt. 2, pp. 1166-1168, 2/1976.

"Bidirectional Fibre Optic Loop-Structured Network", Ito et al, Electronics Letters, 1/22/81.
"An Optical Fibre Data Collection Highway"—Davies et al, Electro-Optics/Laser International, 3/1976.
"Optical Fiber Technology Dam Water Level Measurement Transmission System"—Morales et al.
"Optical Tee Coupler for Data Bus System with Single Multimode Fibers"—Matsui et al., Electronics Letters, 4/1981.
"Micro-Optics Components For Multimode Optical Fiber Systems"—Nunoshita et al.

Primary Examiner—Harry E. Moose, Jr.
Attorney, Agent, or Firm—Bernard, Rothwell & Brown

[57] ABSTRACT

A protective relay system for power system is disclosed which receives electrical information from several points of a power transmission line via optical fiber transmission line to protect the system from a line fault. Instruction is sent to the respective points when a line fault phenomenon is detected from the information received for separating it from the power system. The system has high immunity from electrical noise in the process of information transmission to obtain improved response.

3 Claims, 2 Drawing Figures

PROTECTIVE RELAY SYSTEM FOR A POWER SYSTEM

BACKGROUND OF THE INVENTION

1. Field of the Invention

The present invention relates to a protective relay system for protecting the power system from line fault, and more specifically to a protective relay system which transmits electric information detected from each of the portions in the power system to a central control unit via a transmission line, and which transmits instruction from the control unit to each of the portions via the transmission line.

2. Description of the Prior Art

A conventional system for protecting the power system such as power transmission line, is illustrated in FIG. 1. Here, power transmission lines 1 must be protected from a line fault such as grounding, and provide a protective section via circuit breakers 2, 3, 4, 5 and 6. Electric currents flowing through the circuit breakers 2, 3, 4, 5 and 6 are detected by current transformers 7, 8, 9, 10 and 11, and are input to a protection circuit 22 via circuit terminal boards or conversion signal transmitters 12, 13, 14, 15, 16 and via receiving signal converters 17, 18, 19, 20 and 21, which convert input signals to suitable signal levels. Relying upon the signals from the converters 17 to 21, the protection circuit 22 discriminates a line fault such as by differential protection means. When it is discriminated that a line fault has occurred, the protection circuit 22 provides opening signals to each of its corresponding lines. The opening signals are input to res control circuits 24, 25, 26, 27 and 28 where each is amplified and is converted into an electromagnetic signal, to open the corresponding circuit breakers 2, 3, 4, 5, and 6.

According to the conventional protective relay system, as will be obvious from the above description, cables run along the transmission lines to transmit electric signals detected at a plurality of portions of the transmission lines to remote control circuits. Therefore, electrostatic or electromagnetic noise is easily induced into the cables, giving rise to the occurrence of erroneous operation. Further, when the system is so designed that the control circuits detect differential currents flowing through the transmission lines, detectors must be provided to detect breakage of the cables in order to prevent erroneous operation in case any cable is broken. Accordingly, there are required adjustments in order to get conformity with operations of other portions.

SUMMARY OF THE INVENTION

The principal object of the present invention is to provide a protective relay system for a power system, which is not affected by electrostatic or electromagnetic noise induced by equipment and transmission lines in the power system, and which offers highly reliable operation.

Another object of the present invention is to provide a protective relay system which transmits with high speeds the electric information detected at each of the portions in the power system and information related to the conditions of equipments installed at each of the portions, and which further transmits instruction to the equipment with high speeds, so as to respond quickly upon any line fault phenomena that occurs in the power system.

A further object of the present invention is to provide a protective relay system which is economical and is highly reliable, by employing, as a transmission path, an optical fiber cable to transmit information which is necessary for protecting the power system.

BRIEF DESCRIPTION OF THE DRAWINGS

The above-mentioned objects and effects of the invention will become obvious from a perusal of the following description in conjunction with the accompanying drawings, in which.

DESCRIPTION OF A PREFERRED EMBODIMENT

Figure 1:
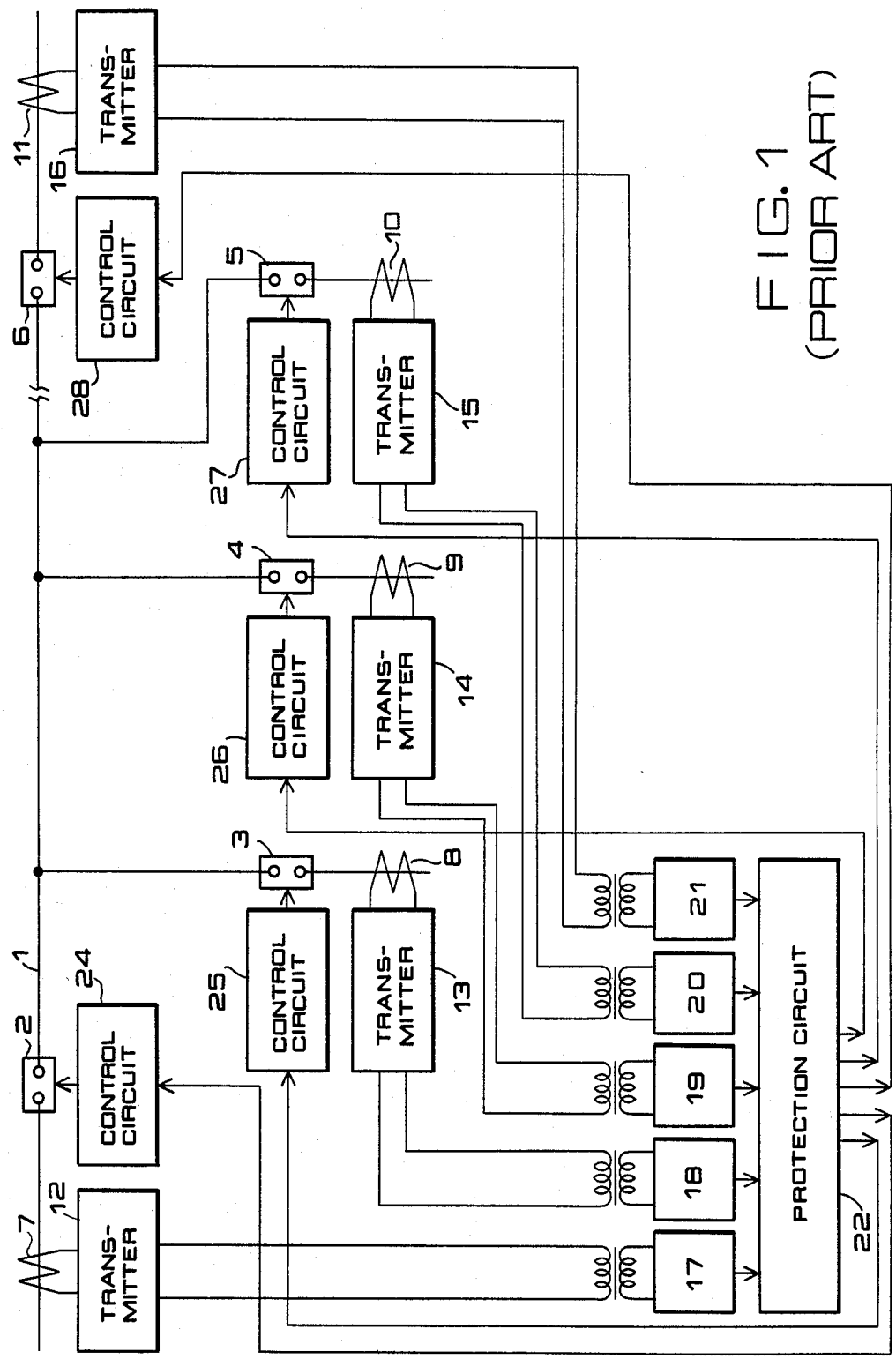
FIG. 1 is a block diagram illustrating the configuration of a protective relay system according to a conventional art.
Figure 2:
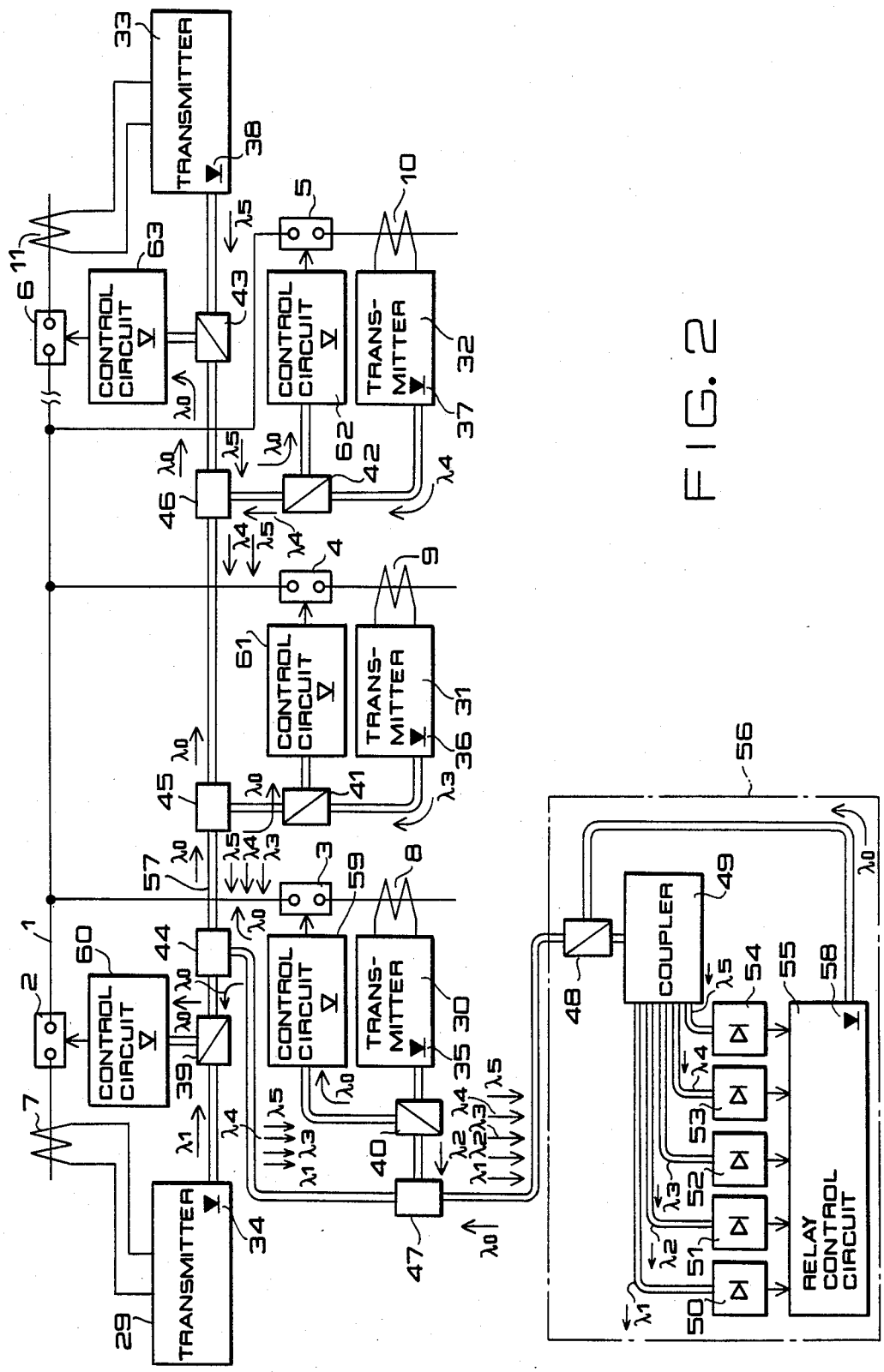
FIG. 2 is a block diagram illustrating the configuration of a protective relay system according to a preferred embodiment of the present invention.

FIG. 2 is a block diagram of a protective relay system in a power system according to an embodiment of the present invention, in which the same reference numerals as those of FIG. 1 denote the same portions as those of FIG. 1, and are not repeatedly described here. To detect the currents flowing through the circuit breakers 2, 3, 4, 5 and 6, the electric currents of the transmission line 1 and the branch lines are transformed through current transformers 7, 8, 9, 10 and 11 respectively, and outputs of the current transformers are input to light modulation signal transmitters 29, 30, 31, 32 and 33, which have light-emitting elements which emit light signals of their respective wavelengths $\lambda_1$, $\lambda_2$, $\lambda_3$, $\lambda_4$ and $\lambda_5$. The light signals produced by these elements are pulse-code modulated by the transmitters 29 to 33 according to respective inputs, and are input to first ports of couplers 39, 40, 41, 42 and 43. The couplers have been disclosed, for example, in a paper "OPTICAL TEE COUPLER FOR DATA BUS SYSTEM WITH SINGLE MULTIMODE FIBERS", by T. Matsui et al, Apr. 16, 1981, ELECTRONICS LETTERS, MITSUBISHI ELECTRIC CORP., Vol. 17, No. 18, pp. 304–305. Light signal of a wavelength $\lambda_0$ is input through a transmission path 57 consisting of optical fiber to second ports that are opposed to the first ports of the couplers 39 to 43 respectively. The light signal is then branched to third ports that are connected by tap to optical paths established by the first and second ports, and is sent to control circuits 60, 59, 61, 62 and 63 that have a function to actuate the circuit breakers 2, 3, 4, 5 and 6. Further, light signals having wavelengths $\lambda_1$ to $\lambda_5$ input to the first ports of the couplers 39 to 43, travel in the direction opposite to that of the light signal of wavelength $\lambda_0$, and are sent to the transmission path 57 through the second ports. The transmission path 57 consists of a single tree-like path connected in series via couplers 43, 44, 45, 46 and 47 which have the same construction as the couplers 39, 40, 41, 42 and 43, to distribute and mix the light signals. The light signals having wavelengths $\lambda_1$ to $\lambda_5$ are sent to a protection circuit 56 via the coupler 47, while the light signal having the wavelength $\lambda_0$ for transmitting instruction is sent from the protection circuit 56 to the transmission path 57 via the coupler 47.

As shown in FIG. 2, the protection circuit 56 consists of a coupler 48 which is connected to the transmission path 57 to introduce light signals having wavelengths $\lambda_1$ to $\lambda_5$, a coupler 47 which is connected to the coupler 48 via an optical fiber and which has five ports for branching the signals, light-receiving demodulator 50 to 54 which are connected to the ports of the coupler 49 through respective optical fibers, and which receive light signals having wavelengths $\lambda_1$ to $\lambda_5$, and a relay control circuit 55 which is connected to the coupler 48 through an optical fiber to send the light signal having wavelength $\lambda_0$ and which selectively receive electric current information that are obtained by demodulating the light signals through the demodulators 50 to 54. The relay control circuit 55 has a decision function and a light transmission function. Namely, the relay control circuit 55 receives current information signals from the demodulators 50 to 54, and compares them with a predetermined reference level signal to decide whether the electric currents flowing through the current transformers 7 to 11 are normal or not. When any abnormal condition is detected from the received information, the relay control circuit 55 sends the instruction in the form of a light signal of wavelength $\lambda_0$ to open circuit breakers 2 to 6.

If now short circuits or grounding fault has occurred, for example, on the lines 1, the current flowing through the current transformers 7-11 increases to an abnormally high level. Therefore, current information of abnormally high level is converted by the transmitters 29-33 into the light signals of wavelength 1-5, which are sent to the coupler 49 via couplers 39-43. The coupler 49 therefore receives the light signals of wavelength $\lambda_1$-$\lambda_5$, which are separated according to wavelength and sent to the demodulators 50-54 via respective parts. The respective current information thus obtained by the demodulators demodulating the light signals is input to the relay control circuit 55 which supervises them at all times to decide whether the current information indicates abnormal level or not. Therefore, when the decision is made that the current information from the demodulators 50-54 indicates abnormal level, the relay control circuit 55 produces instruction in the form of light signal of wavelength $\lambda_0$ to actuate the circuit breaker 2-6 which respectively corresponds to the current transformer 7-11, which is sent to the control circuit 59-63 via the above-mentioned path and via the coupler 39-43. Upon receipt of the breaking instruction in the form of light signal, the control circuit 59-63 actuates the respective circuit breaker 2-6 to accomplish the protection of the power system from the fault.

The above embodiment has dealt with a protective relay system having five pairs of a circuit breaker and a current transformer, associated to a transmission line. The invention, however, encompasses the system where the number of terminals is two or greater than two. Further, occurrence of any line fault may be discriminated relying upon current differential, phase, direction, distance, or the like. Moreover, the systems to be protected should include multi-branch transmission system, parallel two-wire circuit, and the like. It should further be noted that the invention can be modified in a variety of other ways by those skilled in the art without departing from the scope of the invention recited in the claims.

What is claimed is:

1. A protective relay system which supervises a power system based upon electric information detected from each of the portions of the power system that is to be protected, and which protects said power system in case it is detected that a line fault occurs in the power system, said protective relay system comprising:
   a plurality of transmission means for sending the detected electric information into a transmission path by converting it into light signals having their inherent wavelength;
   a plurality of control means which receives light signals having their inherent wavelengths from said transmission path, and which actuate circuit breaker corresponding to said transmission means responsive to instruction transmitted in the form of light signals;
   a protection circuit means which is connected to said transmission means and said control means via the transmission path, which receives light signals from said transmission means to obtain electric information, and which, when abnormal condition is detected in the information through a predetermined process, sends instruction in the form of a light signal having its inherent wavelength to the transmission means which is detected to be a fault phenomenon, the instruction being sent over said transmission path;
   said protection circuit means comprising a first coupler which permits light signals having their inherent wavelengths to pass from said transmission path to the individual transmission means, and which sends a light signal having an inherent wavelength that serves as instruction to said transmission path;
   a second coupler having a multiple of ports to branch the signals, and which branches light signals introduced via said first coupler;
   a plurality of light-receiving demodulators which introduce light signals sent from the branching ports of said second coupler, and which demodulate them into electric information;
   a relay control circuit means which receives information from said demodulators, and which, when the line fault is detected from the information through a predetermined process, sends instruction to the corresponding control means, said instruction being sent in the form of light signal having its inherent wavelength over said transmission path via said first coupler; and
   optical fibers which connect said transmission means, said control means, and said protection circuit means, and which transmit said light signals.

2. A protective relay system according to claim 1, wherein said transmission path consists of optical fibers that are commonly connected together in the form of a tree via optical coupler, so that the light signals can be transmitted to said transmission means, said control means and said protection circuit means bidirectionally.

3. A protective relay system according to claim 1, wherein said transmission means and said control means are arrayed in pairs in a plurality of portions of the power system that is to be protected.

* * * * *

UNITED STATES PATENT AND TRADEMARK OFFICE
CERTIFICATE OF CORRECTION

PATENT NO. : 4,517,619
DATED : May 14, 1985
INVENTOR(S) : Yasuhiro Uekubo

It is certified that error appears in the above-identified patent and that said Letters Patent is hereby corrected as shown below:

Column 1, line 34, "res" should read --respective--.

Column 4, lines 25 and 26, delete "which is detected to be a fault phenomenon".

Signed and Sealed this

Fifteenth Day of October 1985

[SEAL]

Attest:

DONALD J. QUIGG

Attesting Officer

Commissioner of Patents and
Trademarks—Designate